US007232487B2

United States Patent
Silver et al.

(10) Patent No.: US 7,232,487 B2
(45) Date of Patent: Jun. 19, 2007

(54) METHOD FOR MAKING AN EPITAXIAL GERMANIUM TEMPERATURE SENSOR

(75) Inventors: Eric H. Silver, Needham, MA (US); Norman W. Madden, Livermore, CA (US); McDonald Robinson, Goleta, CA (US); Lamonte H. Lawrence, Ross, CA (US)

(73) Assignee: Smithsonian Astrophysical Observatory, Cambridge, MA (US)

( * ) Notice: Subject to any disclaimer, the term of this patent is extended or adjusted under 35 U.S.C. 154(b) by 0 days.

(21) Appl. No.: 10/039,448

(22) Filed: Nov. 9, 2001

(65) Prior Publication Data

US 2004/0217845 A1    Nov. 4, 2004

Related U.S. Application Data

(63) Continuation-in-part of application No. 09/353,548, filed on Jul. 14, 1999, now abandoned.

(60) Provisional application No. 60/092,878, filed on Jul. 15, 1998.

(51) Int. Cl.
*C30B 29/08* (2006.01)

(52) U.S. Cl. .................... 117/89; 117/104; 117/105; 117/936

(58) Field of Classification Search .............. 117/89, 117/104, 105, 936
See application file for complete search history.

(56) References Cited

U.S. PATENT DOCUMENTS

| | | | | |
|---|---|---|---|---|
| 3,173,814 A | * | 3/1965 | Law ........................... | 117/102 |
| 3,200,018 A | * | 8/1965 | Grossman .................... | 117/92 |
| 4,128,733 A | * | 12/1978 | Fraas et al. .................. | 136/255 |
| 4,398,963 A | * | 8/1983 | Stall et al. ................... | 438/507 |
| 5,316,958 A | * | 5/1994 | Meyerson ..................... | 117/88 |
| 6,352,884 B1 | * | 3/2002 | Yu et al. ...................... | 438/166 |
| 2002/0179563 A1 | * | 12/2002 | Horning et al. ................ | 216/2 |

* cited by examiner

*Primary Examiner*—Robert Kunemund
(74) *Attorney, Agent, or Firm*—Sam Pastemack; Choate Hall & Stewart LLP

(57) ABSTRACT

A method of making a highly sensitive epitaxial germanium low temperature sensor that is superior in the method of production and performance than those currently available. The geometry and sensitivity of the sensor can be tuned to desired temperature ranges, and specifically can operate at cryogenic temperatures. The sensor can be manufactured uniformly and reproducibly in large quantities at relatively low cost in which large area arrays are possible. The applications of the sensors range from conventional low temperature thermometry and control in laboratory and industrial settings, to applications associated with infrared, x-ray, particle and plasma physics and spectroscopy.

11 Claims, 2 Drawing Sheets

__US 7,232,487 B2__

METHOD FOR MAKING AN EPITAXIAL GERMANIUM TEMPERATURE SENSOR

CROSS-REFERENCE TO RELATED APPLICATION

This application is a continuation-in-part of U.S. patent application Ser. No. 09/353,548, filed Jul. 14, 1999 now abandoned, which claimed priority from provisional U.S. Patent Application Ser. No. 60/092,878 entitled "Epitaxial Germanium Temperature Sensor" filed on Jul. 15, 1998.

GOVERNMENT SUPPORT

This invention was made in part with government support under grant No. N00014-95-1-1248. The United States Government has certain rights in this invention.

TECHNICAL FIELD

The present invention relates to epitaxial germanium temperature sensors, and more specifically, to epitaxial germanium temperature sensors which can operate at temperatures less than 4K.

BACKGROUND OF THE INVENTION

Recent developments in cryogenic microcalorimeters have led to their increased use in many areas of analytical science and thus also the increased use of temperature sensors that can operate at cryogenic temperatures. For example, when operated below 100 mK, cryogenic microcalorimeters offer nearly 100% efficiency in the x-ray range between 100 eV and 10 keV, and further provide an energy resolution of a few electron volts. Because currently available x-ray detectors lack the capability to provide improved efficiency and resolution simultaneously, they are employed less frequently, and are often replaced by cryogenic microcalorimeters.

For instance, cryogenic microcalorimeters are now being used to improve the spectroscopy of astrophysical and laboratory plasmas, and also in enhancing the sensitivity of x-ray fluorescence methods for trace element determination. Typically it is useful to perform element determination in biological and geological specimens, as well as environmental waste samples, which often includes microanalysis using electron excitation in scanning electron microscopes or x-ray fluorescence using synchrotron radiation and proton excitation.

In a microcalorimeter, x-ray photons are absorbed and thermalized in a detector which is weakly coupled thermally to a cold bath. The resulting rise in the detector's temperature is measured with a thermal sensor, producing an electrical signal that is proportional to the x-ray energy. For operation at temperatures below 4K, these thermal sensors, or thermistors, take advantage of the strong temperature dependence of resistance in doped semiconductor crystals such as silicon or germanium.

Previously, the method of producing temperature sensors via doping crystals was accomplished by three different means: melt-doping, ion implantation, and neutron transmutation. As described below, each of these methods provide only partial solutions to the problem of developing a temperature sensor capable of performing at very low temperatures such as below about 4K.

For instance, although both silicon and germanium can be melt-doped, operating temperatures below 1K can lead to fluctuations of a few percent in the dopant concentration and fluctuations in the resistivity by more than an order of magnitude. Using ion implantation to generate temperature sensors generates high costs associated with uniformly doping large numbers of single crystals, and thus is typically only used in the most specialized and esoteric of applications. Furthermore, the reproducibility associated with ion implantation is relatively low, and the process can introduce radiation damage to the crystal.

Neutron transmutation has been used successfully to uniformly dope germanium for temperature sensor applications over a wide range of temperatures, but has drawbacks associated with methods of application of those sensors. Specifically, the methods available for cutting the thermistor sensors to the appropriate size and for attaching them to the substrate whose temperature is to be measured, are extremely limited. The use of a diamond saw to cut the germanium is expensive, and the glue used to adhere the thermistor to the substrate poses thermal conductance and volume heat capacity problems.

For the above mentioned reasons, a highly sensitive temperature sensor with a performance that is not limited by size is needed, one that can be manufactured reproducibly, uniformly, and in large quantities at a relatively low cost. The present invention provides a technology for making such a temperature sensor.

SUMMARY OF THE INVENTION

As disclosed herein, the invention is a method for making an epitaxial germanium temperature sensor using a chemical vapor deposition process (CVD) to deposit an epitaxial germanium layer onto a substrate. The epitaxial germanium layer is doped during the vapor phase of the CVD process to allow the layer to be resistive. Doping concentration is selected so that at temperatures below about 4K, resistivity of the layer is due to the mechanism of hopping conduction of free carriers.

The substrate can be made from silicon, germanium, sapphire or diamond, and can be a variety of sizes. In this way, the sensor can be manufactured to meet various production requirements. In a preferred embodiment, the substrate is made from silicon and has a diameter of four inches. In another embodiment, the epitaxial germanium layer has a thickness of 2 microns and can be hetero-epitaxial.

The dopant of the epitaxial germanium layer can be arsenic, phosphorus, or antimony and provided in a concentration which makes the epitaxial germanium resistive. In a preferred embodiment, the dopant is arsenic and has a concentration in the layer of $2.0 \times 10^{16}$ cm$^{-3}$. In another embodiment the dopant is arsenic compensated with boron, whereby the arsenic has a concentration of $2.0 \times 10^{16}$ cm$^{-3}$ and the boron has a concentration of $7.2 \times 10^{16}$ cm$^{-3}$. These dopant concentrations are such that at temperatures below about 4K, the resistivity is due to hopping conduction of free carriers.

In a preferred embodiment, the epitaxial layer is 2 microns thick, and the doping step includes doping the epitaxial layer with arsenic (AsH$_3$). In another embodiment, the epitaxial layer is 2 microns thick, and the doping step includes doping the epitaxial layer with arsenic compensated with boron (AsH$_3$/B$_2$H$_6$).

The foregoing has provided some of the preferred embodiments of the present invention. These embodiments should be construed to be merely illustrative of some of the more prominent features and applications of the invention. Additional embodiments, advantages and novel features of the invention will be set forth in part in the following Detailed Description of the Preferred Embodiments.

BRIEF DESCRIPTION OF THE DRAWINGS

For a more complete understanding of the present invention, reference is had to the following description taken in conjunction with the accompanying drawings in which.

DETAILED DESCRIPTION OF THE PREFERRED EMBODIMENTS

First of all, some of the theory on which the present invention is based will be described. The doped epitaxial germanium thermistors or temperature sensors resulting from the method of the invention are heavily doped semiconductors with impurity or dopant concentrations slightly below the metal-insulator transition. The conductivity of these doped semiconductors depends strongly on temperature. The corresponding temperature coefficient is a strong function of the degree of dopant compensation, K, which is the ratio of donors to acceptors. Resistances between $10^6$-$10^8$ ohms can easily be obtained and are optimally matched to the input impedance of the field effect transistor used in the preamplifier used to convert the change in thermistor resistance to a useful electronic signal. The generally accepted theory of operation of these thermistors in the 10 mK to 4K temperature range is the variable range electron hopping mechanism. (See, B. I. Shklovskii and A. L. Efros, in *Electronic Properties of Doped Semiconductors*, Solid State Series, Vol. 45, Springer, Berlin (1984)). The resistivity due to variable range hopping can be described by $\rho_0 \exp(\Delta/T)^{1/2}$ where $\rho_0$ and $\Delta$ are constants that are characteristic of the specific doping level in the thermistor. This mechanism is referred to herein as hopping conduction of free carriers.

Figure 1:
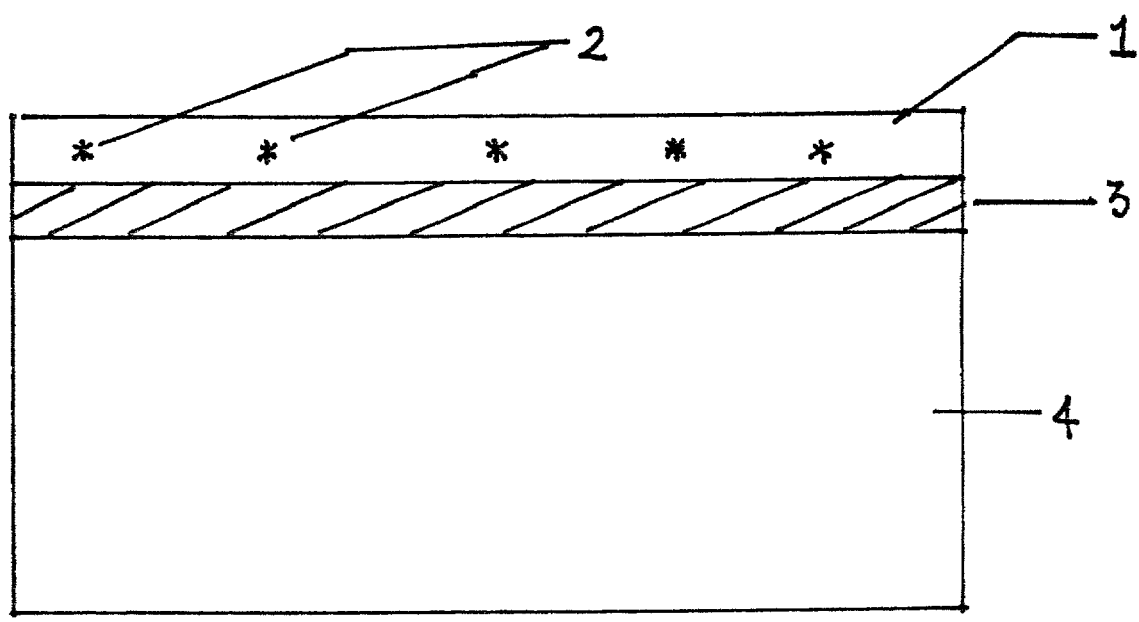
FIG. 1. is a cross-sectional view of an epitaxial germanium temperature sensor.

As discussed above, a layer of epitaxial germanium is grown by chemical vapor deposition (CVD) onto a substrate of silicon to produce a temperature sensor capable of performing at cryogenic temperatures. Referring now to FIG. 1, a layer of epitaxial germanium 1 is grown by chemical vapor deposition onto a substrate 4 for producing a temperature sensor. A dopant 2 is introduced into the epitaxial layer 1 during the vapor phase of the CVD process, providing a selected concentration of dopant impurity. The resulting dopant concentration is such that resistivity in the layer is by hopping conduction of free carriers when the temperature sensor is operated below about 4K. In one embodiment of the invention, the epitaxial layer 1 is 2 microns thick and doped 2 with arsenic and compensated with boron (AsH$_3$/B$_2$H$_6$). In a preferred embodiment, the arsenic has a concentration of $2.0 \times 10^{16}$ CM$^{-3}$ and the boron has a concentration of $7.2 \times 10^{16}$ CM$^{-3}$. The doped epitaxial layer 1 and 2 can be in intimate contact with the substrate 4 thus eliminating the problem of attaching the thermistor to the substrate and minimizing the thermal conductivity between the two. Alternatively, an optional stepped buffer layer 3 can be provided between the epitaxial layer and silicon substrate. In one embodiment the stepped buffer layer can be composed of silicon and germanium and have a thickness of 0.25 microns.

Common semiconductor fabrication technologies can be used to fabricate the size and shape of the epitaxial thermistor which can provide tremendous advantage in minimizing size and associated heat capacity. The epitaxial layer 1 can be grown on four, six, or eight inch diameter silicon wafers making it possible to extract hundreds of individual thermal sensors, and fabricate large area arrays of sensors. The epitaxial layer 1 may be grown as thin as 450 angstroms and as thick as several hundred microns using well-known CVD technology. However, as the technology for controlling the thickness advances, the range of thicknesses will be enhanced. The donor impurity 2 may be elements other than arsenic (e.g. phosphorus, antimony), and a wide variety of substrate material 4 are possible. The epitaxial layers 1 can be grown on substrate 4 which can be composed of germanium, sapphire and diamond as well as silicon. Doped hetero-epitaxial layers are included in the range of possibilities for this technology. Examples include epitaxial layers of germanium on silicon germanium carbon, as well as germanium on insulators.

Figure 2:
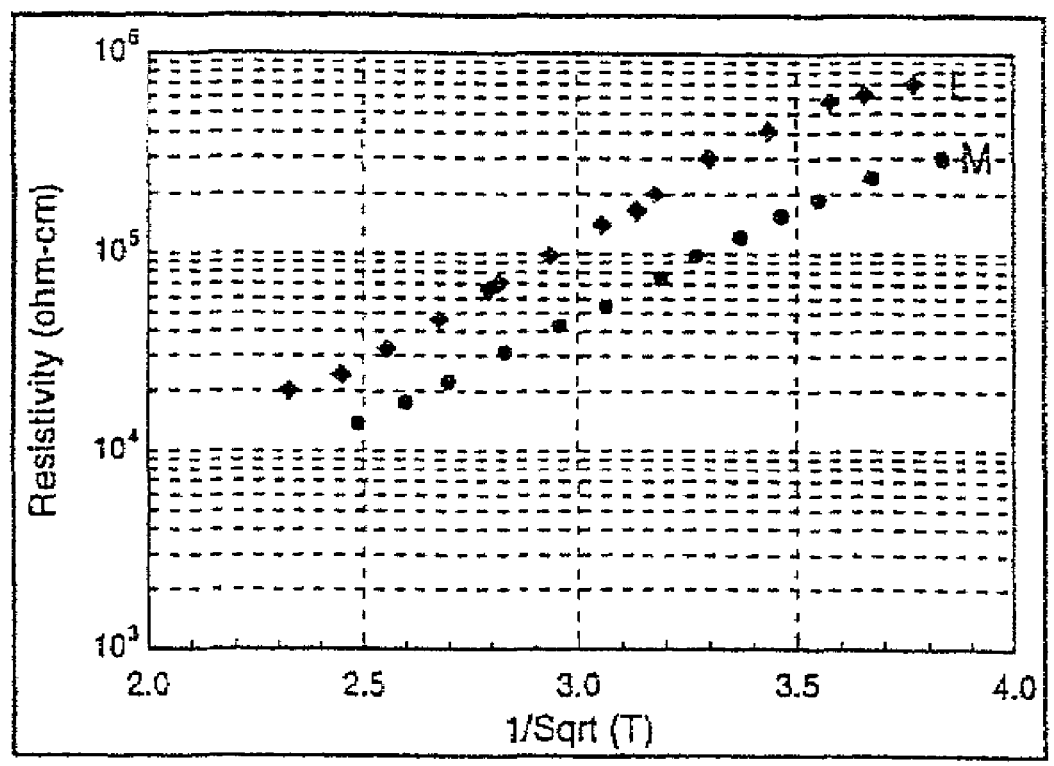
FIG. 2. is a graph showing the relationship between the resistivity and temperature of two prototype epitaxial germanium temperature sensors.

FIG. 2 is a graph which illustrates the relationship of resistivity, with temperature for two prototype epitaxial temperature sensors labeled L and M made by the method of the invention. Sample L has a dopant concentration of $2.2 \times 10^{16}$ cm$^{-3}$ arsenic and $7.5 \times 10^{16}$ cm$^{-3}$ boron. Sample M has a dopant concentration of $2.0 \times 10^{16}$ cm$^{-3}$ arsenic and $7.2 \times 10^{16}$ cm$^{-3}$ boron and also a stepped silicon/germanium buffer layer. The gradients shown in FIG. 2 are at least as large as the best currently found in neutron transmutation germanium.

The technique to produce temperature sensors offered by the present invention allows the possibility of a greater range of dopant concentration without damage to the crystals and a greater range of compensation doping than is possible in neutron transmutation germanium. Referring to FIG. 2, tuning the gradient of resistance versus temperature can be accomplished for desired temperature ranges.

The concentration of the donor impurity may be different from that of the prototypes discussed above; it may be any concentration that makes the epitaxial layer resistive in an arbitrary temperature interval such as below 4K, and assures that resistance is due to hopping conduction of free carriers. The compensating acceptor impurity may be elements other than boron (e.g. gallium). The concentration of the compensating acceptor impurity may be different than that of the prototypes; it may be any concentration that makes the epitaxial layer resistive in an arbitrary temperature interval. The thickness of the epitaxial layer can be different than that of the prototypes.

It should be appreciated by those skilled in the art that the specific embodiments disclosed above may readily be utilized as a basis for modifying or designing other methods or structures for carrying out the same purpose of the present invention. It should also be realized by those skilled in the art that such equivalent constructions do not depart from the spirit and scope of the invention as set forth in the appended claims.

What is claimed is:

1. A method for making an epitaxial germanium temperature sensor, comprising:
   depositing an epitaxial germanium layer onto a substrate by chemical vapor deposition (CVD); and
   doping the layer during the vapor phase of the CVD process with donors and acceptors whose ratio is selected to provide a desired temperature coefficient to a dopant concentration selected so that at temperatures below about 4K, resistivity of the layer is due to hopping conduction of free carriers.

2. The method of claim 1, wherein the epitaxial germanium layer is deposited to a thickness of 2 microns.

3. The method of claim 1, wherein the doping step includes doping the epitaxial germanium with arsenic compensated with boron ($AsH_3/B_2H_6$).

4. The method of claim 1, wherein the substrate is selected from a group consisting of silicon, germanium, sapphire and diamond.

5. The method of claim 1, wherein the depositing step creates an epitaxial germanium layer having a thickness in the range from about 450 angstroms to about 500 microns.

6. The method of claim 1, wherein the depositing step creates an epitaxial germanium layer having a doped heteroepitaxial layer.

7. The method of claim 6, wherein said doped heteroepitaxial layer is selected from a group consisting of an epitaxial layer of gemianium on silicon, an epitaxial layer of germanium on carbon, and an epitaxial layer of germanium on an insulating material.

8. The method of claim 1, wherein the dopant in the doping step comprises a donor selected from a group consisting of arsenic ($AsH_3$), phosphorus and antimony.

9. The method of claim 3, wherein the dopant in the doping step has an arsenic concentration of $2.0 \times 10^{16}$ cm$^{-3}$ and a boron concenfration of $7.2 \times 10^{16}$ cm$^{-3}$.

10. The method of claim 1, wherein the dopant in the doping step has a donor concentration that makes said layer of epitaxial germanium resistive.

11. The method of claim 1, wherein the dopant in the doping step comprises a compensating acceptor impurity selected from a group consisting of boron and gallium.

* * * * *